US008568517B2

(12) United States Patent
Nair et al.

(10) Patent No.: US 8,568,517 B2
(45) Date of Patent: Oct. 29, 2013

(54) MESOPOROUS SILICA MEMBRANE ON POLYMERIC HOLLOW FIBERS

(75) Inventors: Sankar Nair, Atlanta, GA (US);
Kwang-Suk Jang, Atlanta, GA (US);
Christopher Jones, Atlanta, GA (US);
William Koros, Atlanta, GA (US);
Justin Johnson, Atlanta, GA (US)

(73) Assignee: Phillips 66 Company, Houston, TX (US)

(*) Notice: Subject to any disclaimer, the term of this patent is extended or adjusted under 35 U.S.C. 154(b) by 186 days.

(21) Appl. No.: 13/209,957

(22) Filed: Aug. 15, 2011

(65) Prior Publication Data

US 2012/0108418 A1 May 3, 2012

Related U.S. Application Data

(60) Provisional application No. 61/408,719, filed on Nov. 1, 2010.

(51) Int. Cl.
*B01D 53/22* (2006.01)

(52) U.S. Cl.
USPC ............ 96/4; 96/8; 96/10; 95/43; 95/45; 95/51

(58) Field of Classification Search
USPC .............. 95/43, 45, 51; 96/4, 8, 10
See application file for complete search history.

(56) References Cited

U.S. PATENT DOCUMENTS

| 5,968,366 | A * | 10/1999 | Deckman et al. | 210/651 |
| 7,306,647 | B2 * | 12/2007 | Miller et al. | 95/45 |
| 8,132,678 | B2 * | 3/2012 | Liu et al. | 210/506 |
| 2006/0107830 | A1 * | 5/2006 | Miller et al. | 95/45 |
| 2007/0022877 | A1 | 2/2007 | Marand et al. | |
| 2007/0244347 | A1 | 10/2007 | Ying et al. | |
| 2009/0126570 | A1 * | 5/2009 | Liu et al. | 96/4 |
| 2010/0071559 | A1 * | 3/2010 | Miachon et al. | 96/113 |

FOREIGN PATENT DOCUMENTS

WO PCT/US11/47769 8/2011

OTHER PUBLICATIONS

I. A. Aksay et al., Science, vol. 273 (1996) pp. 892-898.
H. Yang et al., J. Mater. Chem., vol. 7 (1997) pp. 1285-1290.
H. Miyata et al., Nat. Mater., vol. 3 (2004) pp. 651-656.

* cited by examiner

*Primary Examiner* — Jason M Greene
*Assistant Examiner* — Anthony Shumate
(74) *Attorney, Agent, or Firm* — Gardere Wynne Sewell LLP; Teresa J. Lechner-Fish (57) ABSTRACT

A gas separation device comprising a porous support structure comprising polymeric hollow fibers, and an inorganic mesoporous membrane disposed on the porous support structure is disclosed. The inorganic mesoporous membrane is uniform and free of defects. Further, the inorganic mesoporous membrane comprises a network of interconnected three-dimensional pores that interconnect with the porous support structure. The gas permeances of the inorganic mesoporous membrane is substantially higher than the gas permeances of the polymeric hollow fibers. A method of fabricating the gas separation device is also disclosed.

24 Claims, 11 Drawing Sheets

MESOPOROUS SILICA MEMBRANE ON POLYMERIC HOLLOW FIBERS

PRIOR RELATED APPLICATIONS

This application claims priority to U.S. Ser. No. 61/408,719, filed Nov. 1, 2010, and incorporated herein by reference in its entirety.

TECHNICAL FIELD

The invention generally relates to membranes for molecular separation, and more particularly to inorganic mesoporous membranes disposed on porous polymeric hollow fibers.

BACKGROUND

Separation membranes have various potential industrial applications including natural gas separation and $CO_2$ capture from power plant flue gases. Membrane-based gas separations have a growing market share due to low energy requirements and facile scale-up of the separation unit. Currently, gas separation applications may involve the use of porous polymeric or inorganic membranes. Polymeric membranes used for gas separation applications may be fabricated in a hollow fiber form. Hollow fiber modules have high surface area/volume ratio, typically in the range of 5,000-10,000 $m^2/m^3$, which is an important design consideration for commercial large-scale processes. While polymeric hollow fibers may be adequate for some separation processes, the gas separation performance of polymeric materials may be limited by their chemical composition and structure.

Despite concentrated efforts to tailor polymer structure to improve separation properties, current polymeric membrane materials have seemingly reached a limit in the trade-off between productivity and selectivity. For example, many polyimide and polyetherimide glassy polymers such as ULTEM® 1000 have much higher intrinsic $CO_2/CH_4$ selectivities (~30 at 50° C. and 690 kPa (100 psig) pure gas tests) than those of polymers such as cellulose acetate (~22), which are more attractive for practical gas separation applications. These polyimide and polyetherimide glassy polymers, however, do not have permeabilities attractive for commercialization compared to current commercial cellulose acetate membrane products. Furthermore, such polymers are prone to plasticize (i.e., swell) upon exposure to high-pressure gases such as $CO_2$, thereby making them unselective.

On the other hand, some inorganic membranes, such as SAPO-34 and DDR zeolite membranes and carbon molecular sieve membranes, offer much higher permeability and selectivity than polymeric membranes for separations. An additional benefit is that these materials do not plasticize. However, their processing routes are currently too expensive and difficult for large-scale manufacture.

Therefore, it remains highly desirable to provide an alternate cost-effective membrane with improved separation properties compared to the polymer membranes. In particular, a long-standing goal has been to produce a selective inorganic membrane on a highly scalable and economical platform (such as a polymeric hollow fiber).

To make fluid separation membranes more competitive with other separation processes, such as distillation, adsorption and cryogenic separations, there is a need to develop novel membranes with at least one of the following properties:

a) Gas separation selectivity comparable or superior to polymeric membranes, and higher throughput than polymeric membranes;
b) High membrane surface area/volume (e.g., hollow fiber membrane module); and
c) Facile scale-up for commercial separation processes.

SUMMARY

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The following abbreviations are used herein:

| | |
|---|---|
| AR | melamine-formaldehyde resin |
| CA | cellulose acetate |
| CTAB | cetyl trimethylammonium bromide |
| EC | ethyl cellulose |
| MCM | Mobil Composition Matter |
| PAN | polyacrylonitrile |
| POSS | polysilsesquioxane |
| PSF | polysulfone |
| PVP | polyvinylpyrrolidone |
| QUAT | quaternary ammonium surfactants |
| SEM | scanning electron microscopy |
| TEOS | tetraethylorthosilicate |
| XRD | X-ray diffraction |

"Mesoporous" is defined herein as having a 3D structure of interconnected pores ranging in diameter from 0.1-10 nm. Preferably, the pore sizes range between 1-5 nm or 2-4 nm in diameter, but the sizes can be varied depending on which gases are to be separated.

The term "polymer" as used herein includes polymers made from one or more monomeric units, and thus is intended to include polymers, copolymers, block copolymers, terpolymers and the like. Where a different meaning is intended, it will be apparent from the context.

The term "free of defects" means that the mesoporous coating is at least 95% free of defects, and preferably at least 97, 98, 99 or 100% free of defects, and that any existing defects are less than 10 nm in diameter, preferably not more than the pore width, such that the coating is essentially continuous and does not allow the gas or liquid to be treated to escape through, e.g., a large crack in the coating.

It has been very difficult to fabricate porous inorganic membranes on industrially scalable surfaces like polymeric hollow fibers until now. Although mesoporous coatings have been demonstrated on flat surfaces and on nanoscale spherical objects, these coatings cannot be used as a membrane on an industrial scale. If the surfaces are nonporous, they cannot be used as membranes at all since permeation of molecules is not possible.

It was not obvious that a thin (~1-10 micron), uniform, defect-free mesoporous coating could be formed on a rough, porous surface (such as that of a polymeric hollow fiber), and furthermore, that the pores would be perpendicular to the surface or interconnected with each other for use as a membrane.

We have surprisingly been able to develop a processing route for making thin, defect-free, mesoporous silica coatings on polymeric hollow fibers, and furthermore used them as a selective membrane for gas separation. Additionally, the mesoporous coated hollow fibers of the invention can be packed together (in the thousands to millions) to make highly compact membrane modules with membrane surface areas of several thousand square meters per cubic meter of module volume.

The method of the invention allows the cost effective, simple synthesis of inorganic mesoporous coatings on porous polymeric hollow fibers for use in various gas separation technologies.

Generally speaking, the method comprises four steps. Firstly, immersion of porous polymeric hollow fibers in an acidic precursor solution containing dissolved silica and a long-chain quaternary amine surfactant. The latter molecules template the formation of mesoporous silica. Next, a vapor-phase treatment is performed with a silica source to complete the formation of a stable mesoporous coating. Thirdly, the quaternary amine is extracted from the mesopores by treatment with an appropriate solvent, thereby opening the mesopores for permeation. Finally, the mesopores are infiltrated with a polyhedral oligomeric silsequioxane molecule, such as POSS™, to impart molecular selectivity to the membrane. Several types of POSS™ molecules are commercially available. The porous polymeric hollow fibers can be previously produced by an established spinning process.

The quaternary amine molecules can be extracted from the membrane by treatment with a solvent, thereby creating an empty mesoporous structure that can be later filled or functionalized to tailor molecular selectivity of the membrane, such as with amine groups, thiol groups, carboxyl groups, cyano groups, amide groups, carbonyl groups, bioreactive groups and the like.

In more detail, the method includes preparing a coating solution, wherein the coating solution comprises a mixture of a silica source, a quaternary amine surfactant, and acidic water; immersing polymeric hollow fibers in the coating solution, thereby forming a wet mesoporous silica membrane on the polymeric hollow fibers; rinsing and drying the wet mesoporous silica membrane on the polymeric hollow fibers, thereby forming a dried mesoporous silica membrane on the polymeric hollow fiber; and aging the dried mesoporous silica membrane in a vapor of, for example, saturated alkoxysilane. If desired, the quaternary amine molecules can be extracted from the membrane by treatment with an appropriate solvent, rinsing and drying. The remaining mesoporous hollow fiber can then be derivatized as desired for a particular application.

The support polymeric hollow fiber used can be any suitable polymer or copolymer made by any conventional method, e.g., spun from a solution through a spinneret. Such hollow fibers include polymeric hollow fibers including various types of polyimides and polyamides (e.g., Torlon®, Ultem®, Matrimid®), PVP, CA, PSF, PAN, EC, AR and the like.

The silica in the dissolved silica (silicon hydroxide, also referred to as silicic acid or $[SiO_x(OH)_{4-2x}]_n$) can be from any source. Silicic acids may be formed by acidification of silicate salts (such as sodium silicate) in aqueous solution, and herein we employed a common source of silica, which is tetraethylorthosilicate (TEOS). It is known that use of different alkoxysilanes can control the type of mesoporous silica. Use of TEOS can create a mesoporous silica Mobil Composition Matter 48 (MCM-48) surface (as detailed below), whereas use of other silicates and surfactants can create other mesoporous silicas.

Quarternary amine surfactants (also known as quats) include the positively charged polyatomic ions of the structure $NR_4^+$, R being an alkyl or aryl group, and where the each R can be the same or different. In preferred embodiments, the R is an alkyl or aryl of at least 6, for example 8 carbons. Preferred quaternary amine surfactants include benzalkonium chloride, benzethonium chloride, methylbenzethonium chloride, cetalkonium chloride, cetylpyridinium chloride, cetrimonium, cetrimide, dofanium chloride, tetraethylammonium bromide, didecyldimethylammonium chloride and domiphen bromide, and the like. Particularly preferred is cetyltrimethylammonium bromide.

One embodiment of a gas separation device in accordance with the present disclosure includes a porous support structure comprising polymeric hollow fibers and a mesoporous membrane or coating disposed on the porous support structure, wherein the mesoporous membrane comprises an inorganic material such as silica. In an alternate embodiment, the inorganic material may comprise a composite mesoporous material, the composite mesoporous material comprising a mesoporous MCM and a quaternary amine.

Mobil Composition of Matter (MCM) is the initial name given for a series of mesoporous crystalline materials that were first synthesized by Mobil Oil Corp.'s researchers in 1992. MCM-41 and MCM-48 are two popular mesoporous molecular sieves that have been extensively studied by researchers. A striking feature of MCM-41 and MCM-48 is that, although composed of an amorphous silica wall, they possess a long-range ordered pore structure with uniform mesopores. Specifically, MCM-41 displays a hexagonal packing of one-dimensional channels, whereas MCM-48 has two independent and intricately interconnected networks of three-dimensional mesoporous channels. Use of mesoporous materials, such as the MCMs, is also important because they possess large surface area, which can up to more than 1000 $m^2g^{-1}$. Moreover, the pore diameter of these materials can be controlled within mesoporous range between 1.5 nm to 20 nm by adjusting the synthesis conditions and/or by employing surfactants with different chain lengths in their preparation. However, for separation of small gas molecules (<0.5 nm in size), the pores must be functionalized further, owing to their relatively large size.

In an exemplary embodiment, the MCM may comprise MCM-48, and the quaternary amine may comprise cetyltrimethylammonium bromide (CTAB). In another embodiment, the mesoporous membrane may comprise a mesoporous structure having a network of three-dimensional pores, and the quaternary amine may be disposed in the pores of the mesoporous membrane.

Methods of fabricating gas separation devices are also disclosed in the present disclosure. It is possible to scale up the preparation of one foot or longer silica/CTAB membranes in the present disclosure free of any substantial defect, and such long coated hollow fibers can be bundled together to make various separation devices. There appears no limitation to the formation of these coatings on hollow fibers of any desirable length. These devices can then be used in various separation or purification processes.

DESCRIPTION

Figure 1:
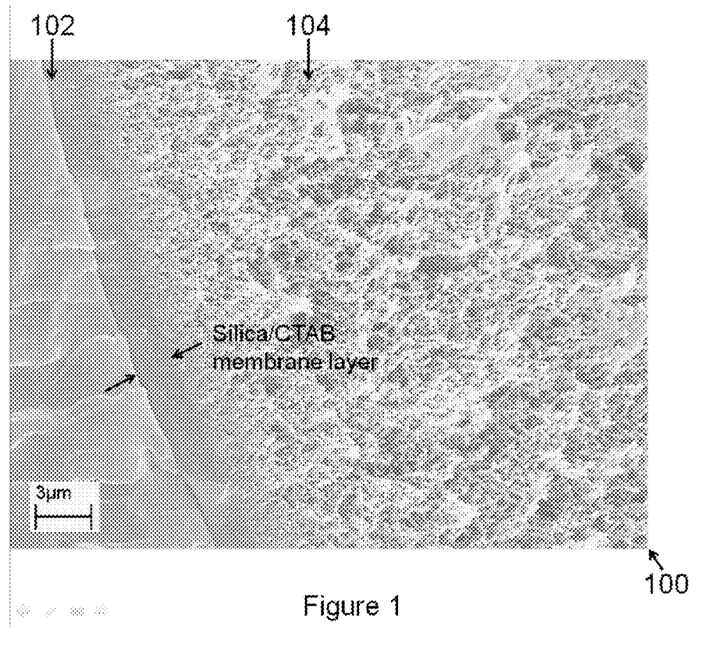
FIG. 1 is a cross-section scanning electron microscope image of a silica/CTAB membrane coated ULTEM™ hollow fibers.
Figure 2:
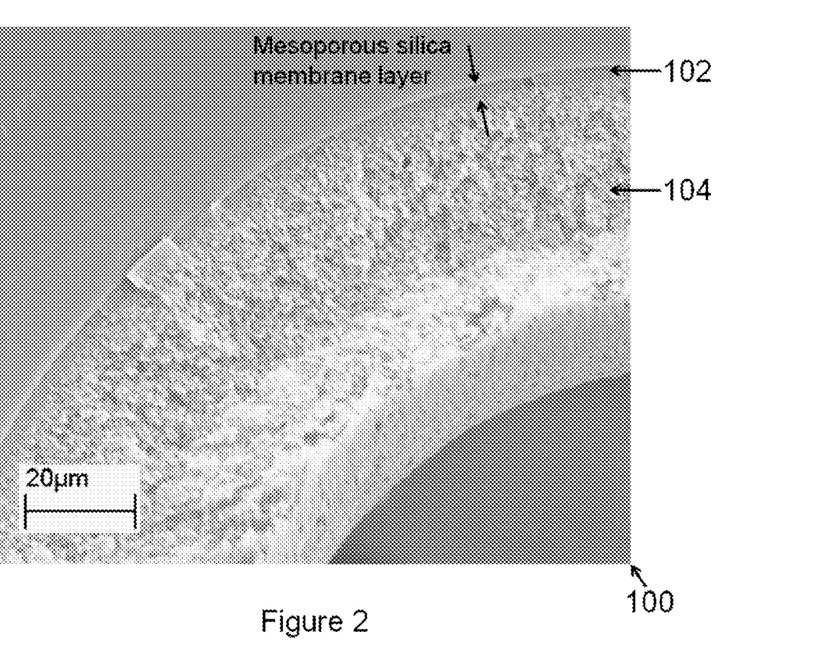
FIG. 2 is a cross-section scanning electron microscope image of the mesoporous silica membrane coated ULTEM™ hollow fibers after surfactant extraction.

One aspect of the present disclosure relates to gas separation devices and methods of manufacturing and using them. Referring to FIGS. 1 and 2, which is a cross-section image of a gas separation device 100, a mesoporous membrane 102 is disposed on a porous support structure 104 comprising polymeric hollow fibers. The mesoporous membrane 102 has a mesoporous structure that includes a network of three-dimensional pores that connect with the pores of the hollow fiber. The pores of the membrane 102 may be between 0.1-10 nm in diameter, preferably 1-4 nm, 2-4 nm, or about 3 nm in diameter. The mesoporous membrane 102 may comprise a suitable inorganic material, such as a mesoporous MCM. The MCM may be silica-based, such as MCM-48 or MCM-41, and the like.

Another suitable inorganic material may be a composite mesoporous material. For example, the composite inorganic material may include a MCM-type material and a quaternary amine. In an exemplary embodiment, the mesoporous membrane 102 may comprise MCM-48 and cetyltrimethylammonium bromide (CTAB). The CTAB may be disposed in the network of pores formed in the MCM-48 mesoporous structure.

The porous support structure 104 may be made from any suitable polymer spun by a conventional method (e.g., spun from a solution through a spinneret). Exemplary hollow fiber polymers are polyetherimide and polyamide-imide under the trade name ULTEM™ and TORLON™, respectively.

An exemplary self-assembly method is provided herein for preparing a mesoporous silica MCM-48/CTAB composite membrane with ordered continuous cubic structure. Conventional techniques for coating silica/surfactant composite films with 2-dimensional hexagonal, 3-dimensional hexagonal and simple cubic structures on dense flat surfaces are described in I. A. Aksay et al., *Science*, vol. 273 (1996) pp. 892-898; H. Yang et al., *J. Mater. Chem.*, vol. 7 (1997) pp. 1285-1290; H. Miyata et al., *Nat. Mater.*, vol. 3 (2004) pp. 651-656, all of which are hereby incorporated by reference.

The present disclosure, however, provides an improved immersion technique for disposing a composite membrane on porous hollow fibers as well as on a flat, dense surface. The presence of the porous, rough surface alters the mechanism of formation of the mesoporous coating in comparison to a flat, dense surface, because the combination of physical and chemical interactions between the reactants and the surface changes. Importantly, the mesoporous coatings must be uniform over large areas and/or fiber lengths, and free of defects (such as pin-holes and cracks) over large areas and/or fiber lengths. Therefore, molecules should only permeate through the pores of the mesoporous material. Such capabilities have not been previously demonstrated.

In an embodiment according to the present disclosure, a MCM-48/CTAB composite membrane layer is prepared by immersion of the polymeric hollow fibers in a coating solution containing a dissolved silica source, CTAB, and acidic water for between 10 minutes and 24 hours at a temperature of 10-80° C. The pH of the coating solution may be between 0 and 4, as adjusted by adding an acid (e.g., HCl). The composition of the mixture solution may be expressed in terms of the following molar ratios: 1.0 $SiO_2$:a CTAB:b $H_2O$. In an embodiment, a is between 0.1 and 1, and b is between 20 and 200. In one embodiment, the source of silica is alkoxysilane, such as tetraethylorthosilicate (TEOS), fumed silica, colloidal silica and the like.

After immersion of at least a portion of the polymeric hollow fibers in the coating solution, an MCM-48/CTAB composite membrane layer is grown on the surface of the polymeric hollow fibers. It is believed that during substrate immersion in the coating solution, surfactants are adsorbed on the surface of the substrate and self-assemble to form ordered micelles. At the same time, capillary forces can be used to drive the reactant solution into the pores of the hollow fiber near the surface, thereby further assisting the formation of a continuous membrane. Silica precursors are intercalated into the self-assembled surfactants and silica/CTAB composite is thereby grown at the surface of the porous substrate.

The resultant MCM-48/CTAB membranes include a silica structure containing a network of 3-dimensionally ordered pores filled with CTAB molecules. The diameter of the channels is preferably between 1 nanometer and 5 nanometers. In the MCM-48/CTAB membrane, CTAB molecules may be confined within the rigid silica wall, and continuously connected to each other.

Figure 3:
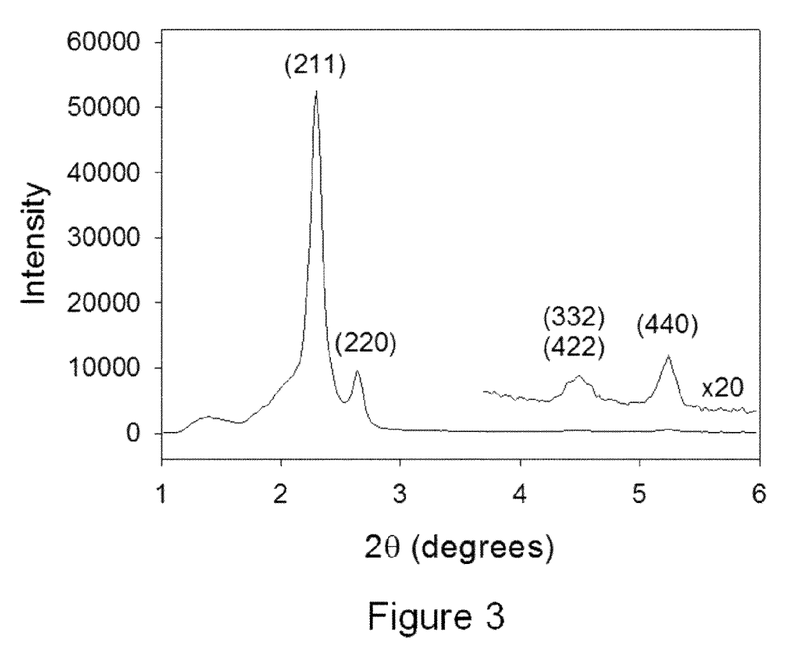
FIG. 3 is a low-angle X-ray diffraction pattern of a silica/CTAB membrane coated on ULTEM™ film.

The presence of an MCM-48/CTAB membrane or coating is confirmed by XRD as shown in FIG. 3 and by SEM as shown in FIG. 1. The MCM-48/CTAB membrane is shown to be disposed on a transition layer over a transition layer of the coated polymeric hollow fibers.

The thickness of the MCM-48/CTAB membrane layer depends in part on the immersion time and the porous structure of the polymeric hollow fibers. The layer thicknesses can be measured by scanning electron microscopy.

The MCM-48/CTAB membrane is then aged with saturated TEOS vapor in a closed vessel prior to use. We have discovered that the initial coating of mesoporous silica is silicon-deficient (i.e., there are not enough silicate species to form a mechanically strong network, even though it does form a cubic pore structure). However, when exposed to TEOS vapor, additional silica species were provided and incorporated into the existing network, thus strengthening the mesoporous structure. In one embodiment, an aging temperature is between 50° C. and 150° C., and an aging period is between 1 hour and 48 hours may be used.

The gas separation performance of hollow fiber membranes can be evaluated by measuring its gas permeance. Permeance is measured in gas permeation units (GPU), which is defined as follows:

$$GPU = \frac{10^{-6} \times cm^3(STP)}{cm^2 \times sec. \times (cm.Hg)}$$

In other words, permeance of a membrane may be measure in terms of the amount of gas permeated by the membrane per unit time (cm$^3$(STP)/sec) per unit (cm$^2$) surface area of the membrane, per unit pressure difference (cm. Hg) across the membrane. The selectivity of gas separation membranes is defined as the ratio of the rate passage of the more permeable components (e.g., $CO_2$) to the rate of passage of the less permeable component (e.g., $N_2$).

In one embodiment, the support ULTEM™ hollow fiber has $CO_2/N_2$ selectivity of 6.7 at 35° C. for gases with 100 psig feed pressure. In another embodiment, $N_2$ and $CO_2$ permeances of the silica/CTAB membrane coated on ULTEM™ hollow fibers were measured at the feed pressures in the range of 50 psig to 100 psig, and the results are summarized below in TABLE 1.

TABLE 1

| Feed pressure (psig) | $N_2$ permeance (GPU) | $CO_2$ permeance (GPU) | $CO_2/N_2$ permeance ratio |
|---|---|---|---|
| 50 | 0.38 | 5.8 | 15 |
| 60 | 0.37 | 6.2 | 17 |
| 70 | 0.33 | 6.7 | 20 |
| 80 | 0.39 | 7.1 | 18 |
| 90 | 0.45 | 7.7 | 17 |
| 100 | 0.45 | 9.4 | 21 |

In another embodiment, $CO_2/N_2$ selectivity at the feed pressure of 100 psig was increased from 6.7 to 21 after silica/CTAB membrane coating. Selective transport of $CO_2$ through silica/quat composite membranes is facilitated by adsorption of $CO_2$ to quaternary amine group of CTAB and by diffusion through continuously connected CTAB channels. However, the permeation property is not stable with time. The results are summarized below in TABLE 2. CTAB in the mesopore may be extruded during the gas permeation measurements.

TABLE 2

| Measurement | $N_2$ permeance (GPU) | $CO_2$ permeance (GPU) | $CO_2/N_2$ permeance ratio |
|---|---|---|---|
| Day 1 | 0.45 | 9.4 | 21 |
| Day 2 | 0.82 | 10 | 12 |
| Day 3 | 10 | 21 | 2.1 |

In one embodiment, silica/quat membranes of the present disclosure can be coated on hollow fibers without skin layers. In another embodiment, the support TORLON™ hollow fiber without skin layer has $CO_2$ permeance of 50,000 GPU and $CO_2/N_2$ selectivity of 0.93 at 35° C. for gases with 10 psig feed pressure. In yet another embodiment, $N_2$ and $CO_2$ permeances of the silica/CTAB membrane coated on TORLON™ hollow fibers were measured at the 50 psig feed pressure. The silica/quat membrane has $CO_2$ permeance of 11 and $CO_2/N_2$ selectivity of 1.9.

In another embodiment, the quaternary amine molecules confined within the ordered silica wall can be removed by the solvent extraction. The extraction method used in the present disclosure allows the production of mesoporous silica membranes with continuous open pore channels formed on support polymeric hollow fibers. In this embodiment, the quaternary amine molecules are extracted using a solvent such as water, alcohols or a mixture thereof, for a duration between 1 hour and 72 hours at a temperature between 20° C. and 100° C. The pH of the extraction solvent may be between 0-7, as adjusted by adding an acid (e.g., HCl). Examples of alcohols include, but are not limited to methanol, ethanol, propanol, isopropanol, butanol, isobutanol, sec-butanol, and tert-butanol.

Figure 4:
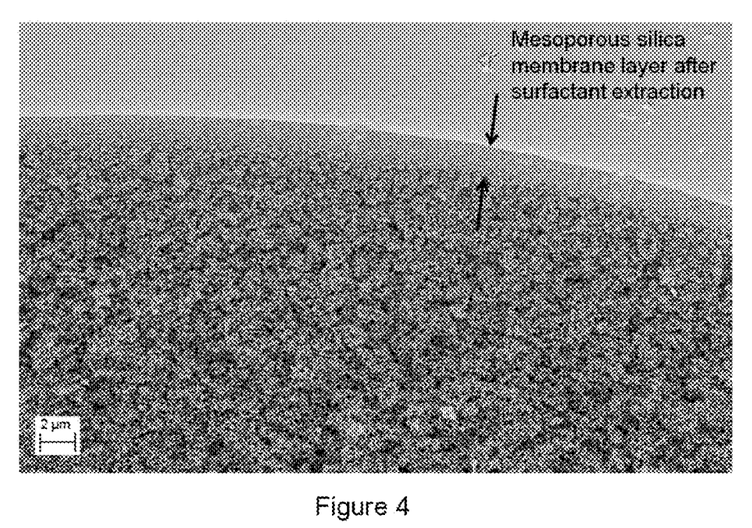
FIG. 4 is a cross-section scanning electron microscope image of the mesoporous silica membrane coated TORLON™ hollow fibers after surfactant extraction.

After the solvent extraction, the continuous silica membrane layer coated on the polymeric hollow fiber is maintained as shown in FIGS. 2 and 4. After the solvent extraction, the mesoporous silica membrane coated on ULTEM™ hollow fiber has a $N_2$ permeance of 3.2 GPU and $CO_2$ permeance of 15 GPU at 35° C. for gases with 100 psig feed pressure. The above $N_2$ and $CO_2$ permeances are equivalent to those of the support ULTEM™ hollow fibers. After the solvent extraction, the mesoporous silica membrane coated on TORLON™ hollow fiber has a $CO_2$ permeance of 4,400 GPU and $N_2$ permeance of 3,300 GPU at 35° C. for gases with 50 psig feed pressure. The support TORLON™ hollow fiber has a $CO_2$ permeance of 50,000 GPU and $N_2$ permeance of 54,000 GPU at 35° C. for gases with 10 psig feed pressure. These permeances show that CTAB has been extracted and the mesoporous silica membrane has continuous open pore channels.

After quat extraction as described above, the mesoporous channels are open for filling or functionalization with other desired molecules or functional groups in order to tailor the gas-selective properties of the membrane. Thus, standard chemical reactions can derivatize or couple the silica base to various reactive groups, such as with thiol groups, carboxyl groups, cyano groups, amide groups, carbonyl groups, and the like. Bioreactive groups can also be added thereto, such as receptors, ligands, antibodies, antigens, strepavidin, biotin, drug molecules, and the like.

With the selective use of such functional groups, the separation devices can be used in many different applications. For example, gases can be separated and/or recovered from various manufacturing facilities, exhaled gases can be measured for metabolite contents, and the like.

In one embodiment, polyhedral oligomeric silsequioxane molecules, known as POSS™, are used as a mesopore-filling material. The basic structure of a POSS™ molecule comprises eight $SiO_4$ tetrahedra connected to form a cubic shape. A number of organic side-groups can be attached to the Si atoms, thereby creating a diverse set of molecular shapes, sizes, and functionalities. The infiltration method used in the present disclosure allows the production of POSS™-infiltrated mesoporous silica membranes. In this embodiment, CTAB extracted mesoporous hollow fibers are immersed in a POSS™ solution using a solvent such as chloroform, toluene, acetone, alcohols or a mixture thereof, for a duration between 1 minute and 72 hours at a pressure between 0.01 atm and 1 atm. The concentration of POSS™ is between 0.1 mg/mL and 100 mg/mL. It is believed that during the immersion, POSS™ molecules are infiltrated into the mesopores by the capillary force.

Figure 5:
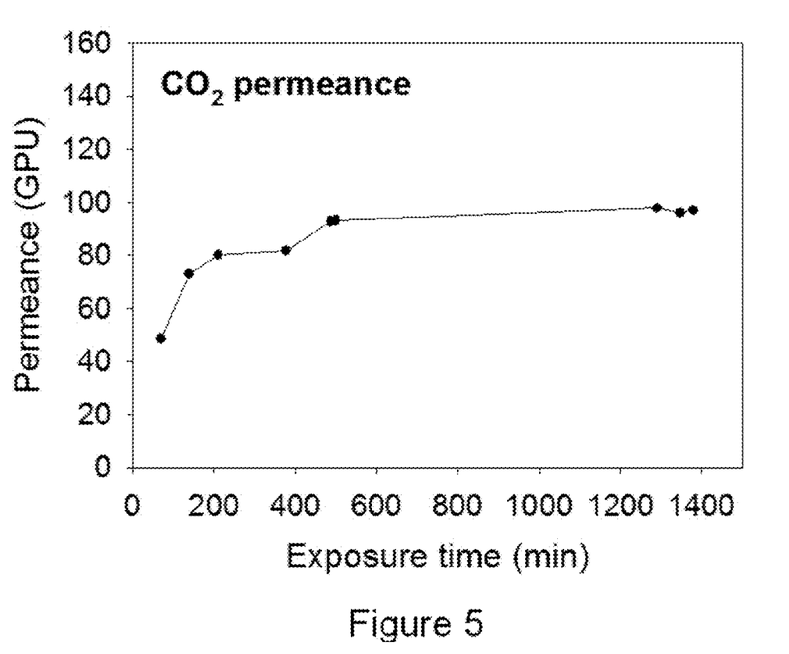
FIG. 5 is $CO_2$ permeance of mesoporous silica membrane coated on TORLON™ hollow fiber after aminoethylaminopropylisobutyl-POSS™ infiltration.
Figure 6:
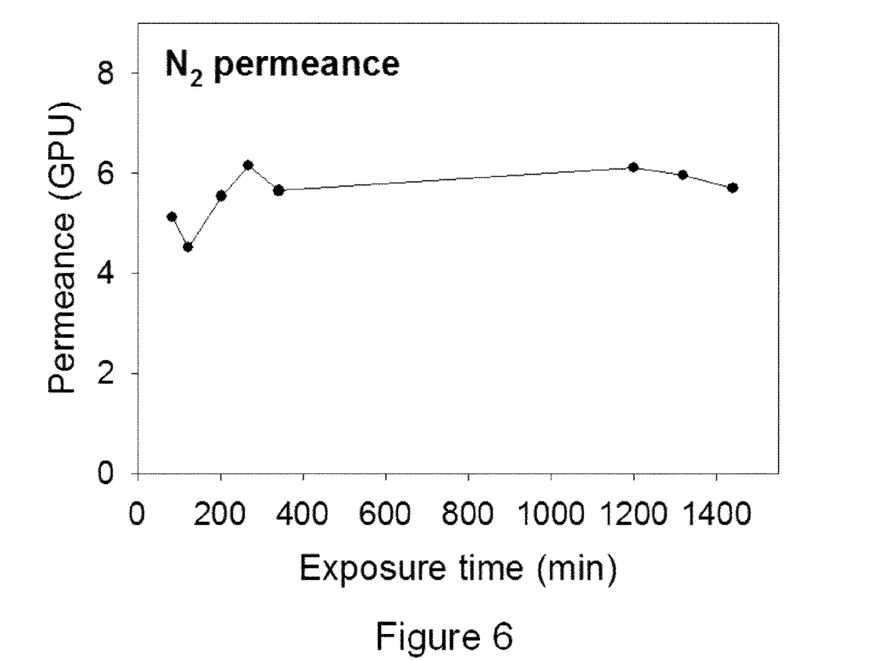
FIG. 6 is $N_2$ permeance of mesoporous silica membrane coated on TORLON™ hollow fiber after aminoethylaminopropylisobutyl-POSS™ infiltration.

Among the various POSS™ molecules, heptaisobutyl-(2-aminoethyl(3-aminopropyl)octasilsesquioxane, known as aminoethylaminopropylisobutyl-POSS™, can be used for acid gas separation. In one embodiment, the POSS™-infiltrated silica membranes of the present disclosure can be used for separation of acid gases (e.g., $CO_2$ and $H_2S$) from other components (e.g., $N_2$, $CH_4$) in a natural gas stream. Selective transport of acid gases through the composite membranes is facilitated by adsorption of acid gas to amine groups of aminoethylaminopropylisobutyl-POSS™ and surface diffusion through the POSS™-infiltrated channels. After the infiltration of aminoethylaminopropylisobutyl-POSS™, the mesoporous silica membrane coated on TORLON™ hollow fiber has a $CO_2$ permeance of 96 GPU and ideal $CO_2/N_2$ selectivity of 16 at 35° C. for gases with 50 psig feed pressure (FIGS. 5-6).

These embodiments provide an acid gas selective membrane with a hollow fiber support and its economically feasible manufacture method. The POSS™-infiltrated silica membranes of the present invention can be prepared just by simple immersion, vapor deposition, extraction, and infiltration techniques.

EXAMPLE 1

Mesoporous Silica/CTAB on Ultem™

As a support polymeric fiber, ULTEM™-1000 hollow fibers were used. The ULTEM™ hollow fibers were spun from a solution through a spinneret. The diameter of the support fiber was 270 microns, and the fiber layer thickness was in the range of 30 microns to 60 microns. The support fiber layer was composed of substructure, transition, and skin layers (from inner layer to outer layer). Thickness of the transition layer was 8 microns and the pore size of transition layer was approximately 100 nanometers. The thickness of the skin layer was approximately 100 nanometers, and the skin layer had sub-nanometer regime pore defects.

Silica/CTAB membranes were then prepared on the above ULTEM™ hollow fibers. For the membrane coating, the support fibers were immersed in the coating solution for 1 hour at 20° C. The mixture solution had the approximate molar composition: 1 TEOS:0.425 CTAB:0.00560 HCl:62.2 $H_2O$.

After the immersion process, the fiber was rinsed with ethanol and dried. The prepared hollow fiber membranes were aged with saturated TEOS vapor prior to use. Thirty cm-long hollow fiber was located with 50 microliters of TEOS in the closed vessel at 100° C. for 24 hours. After the aging process, the hollow fiber membranes were rinsed with ethanol and dried.

Low-angle X-ray diffraction (XRD) pattern of silica/CTAB membrane coated on ULTEM™ film is shown in FIG. 3. The XRD peaks of FIG. 3 are indexed as (210), (220), (332)/(422), and (440) of continuous cubic ia3d structure. FIG. 3 shows that the CTAB molecules are confined within the ordered silica wall, and continuously connected each other.

Figure 7:
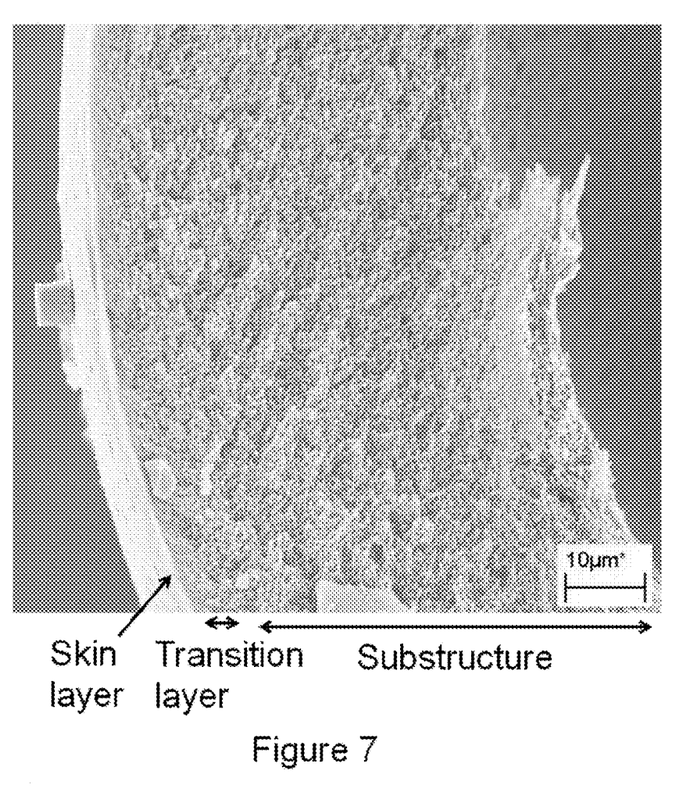
FIG. 7 is cross-section scanning electron microscope image of the support ULTEM™ hollow fiber.

FIGS. 7 and 1 are cross-section scanning electron microscope (SEM) images of the support ULTEM™ hollow fiber, and the silica/CTAB membrane coated ULTEM™ hollow fiber, respectively. FIG. 7 shows a skin layer, a transition layer, and a substructure. The silica/CTAB composite layer was grown on the porous transition layer to form continuous silica/CTAB membrane layer in the outer part of the support fiber (FIG. 1). The silica/CTAB membrane thickness is 1 micron (FIG. 1).

Single gas permeation was measured using a fiber permeation test module and a permeation testing system for the uncoated ULTEM™ fiber described in Koros et al. (U.S. Pat. No. 7,247,191), which is hereby incorporated by reference. Pure gases were fed into the fiber interior through one end of the fiber. Temperature of the permeation testing system was maintained at about 35° C. during the measurement. The flux through the fiber was measured with bubble flow meters. Atmospheric pressure was maintained on the downstream side and the temperature of the downstream side was near 20° C. The flux was converted to permeance as described.

At 100 psig, $N_2$ permeance and $CO_2$ permeance of the tested fiber were 2.1 GPU and 14 GPU, respectively. Ideal $CO_2/N_2$ selectivity of the fiber was 6.7. At 100 psig, $N_2$ permeance and $CO_2$ permeance of the ULTEM™ hollow fiber were 0.45 GPU and 9.4 GPU, respectively (TABLE 1). After silica/CTAB membrane coating, ideal $CO_2/N_2$ selectivity was increased from 6.7 to 21. The permeation property was not stable over time. After 2 days from the above measurements, $CO_2$ permeance increased to be 21 GPU and ideal $CO_2/N_2$ selectivity decreased to be 2.1 (TABLE 2). CTAB in the mesopore might be extruded during the gas permeation measurement.

EXAMPLE 2

Mesoporous Silica/CTAB on Torlon™

Figure 8:
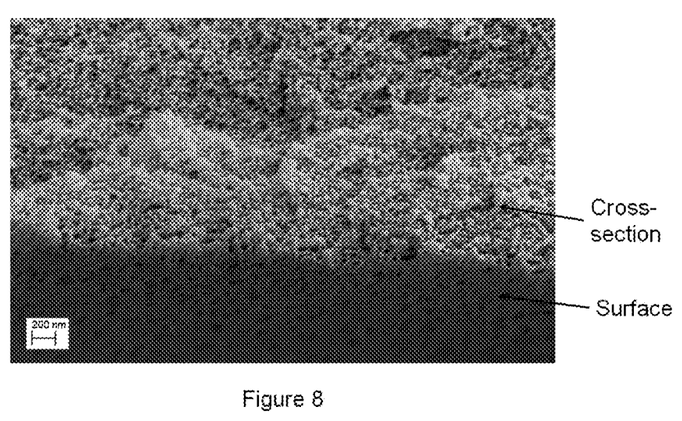
FIG. 8 is cross-section scanning electron microscope image of the support TORLON™ hollow fiber.

As a support polymeric fiber, TORLON™ 4000T-LV hollow fibers were also used. The TORLON™ hollow fibers were spun from a solution through a spinneret. Diameter of the support fiber was 220 microns, and the fiber layer thickness was in the range of 30 microns to 60 microns. The support fibers did not have skin layers, and had open pores at the outer surface (FIG. 8). At 10 psig feed pressure, $CO_2$ and $N_2$ permeances of the support TORLON™ hollow fiber were 50,000 GPU and 54,000 GPU, respectively.

Silica/CTAB membranes were then prepared on the above TORLON™ hollow fibers. For the membrane coating, the support fibers were immersed in the coating solution for 5 hour at 20° C. After immersion process, the fiber was rinsed with ethanol and dried. The prepared hollow fiber membranes were aged with saturated TEOS vapor. After the aging process, the hollow fiber membranes were rinsed with ethanol and dried. At 50 psig, $N_2$ permeance and $CO_2$ permeance of the silica/quat membrane coated on TOPRLON™ hollow fiber were 5.9 GPU and 11 GPU, respectively.

EXAMPLE 3

Quat Extraction

For CTAB extraction, a 30 cm-long ULTEM™ hollow fiber that had been coated with silica/CTAB membrane was immersed in 100 milliliters of 0.05 N HCl/ethanol under moderate stirring for 48 hours at 20° C. After the extraction process, the fiber was rinsed with ethanol and dried. After the template extraction, the continuous mesoporous silica membrane layer coated on the ULTEM™ hollow fiber was confirmed by the cross-section SEM image (FIG. 2). $N_2$ permeance and $CO_2$ permeance of the mesoporous silica membrane coated ULTEM™ hollow fiber after the template extraction were measured to be 3.2 GPU and 15 GPU, respectively, at the feed pressure of 100 psig.

For CTAB extraction of silica/CTAB membranes coated on TORLON™ hollow fibers, ethanol and 0.05 N HCl/ethanol were used. After 24-hour extraction using ethanol, $N_2$ permeance and $CO_2$ permeance were measured to be 1,900 GPU and 1,700 GPU, respectively, at the feed pressure of 50 psig. When using 0.05 N HCl/ethanol, $N_2$ permeance and $CO_2$ permeance were measured to be 3,300 GPU and 4,400 GPU, respectively, at the feed pressure of 50 psig.

Figure 9:
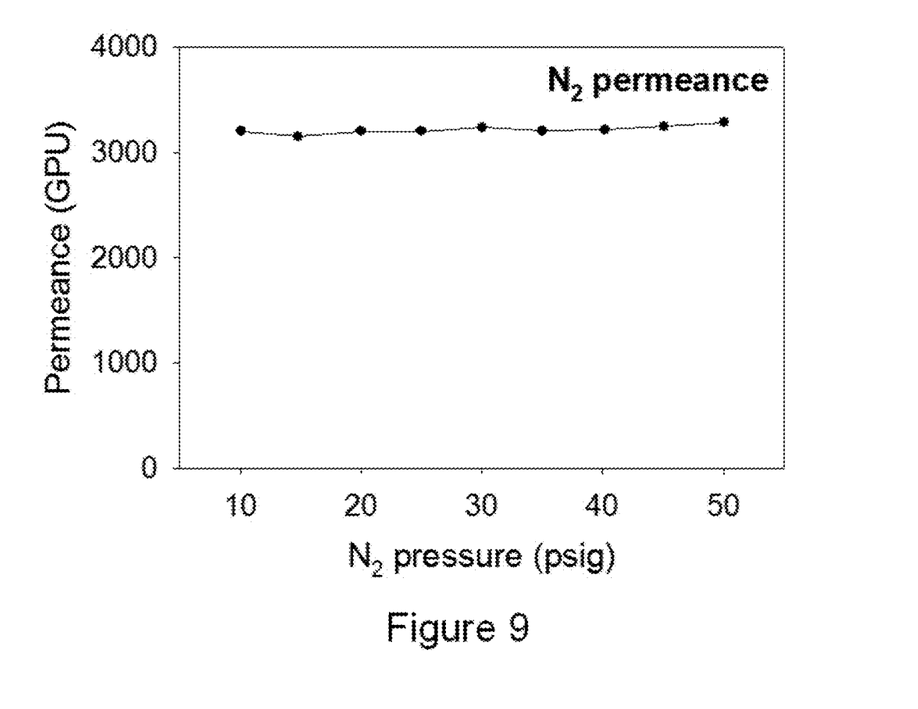
FIG. 9 is $N_2$ permeance of mesoporous silica membrane coated on TORLON™ hollow fiber after template extraction.
Figure 10:
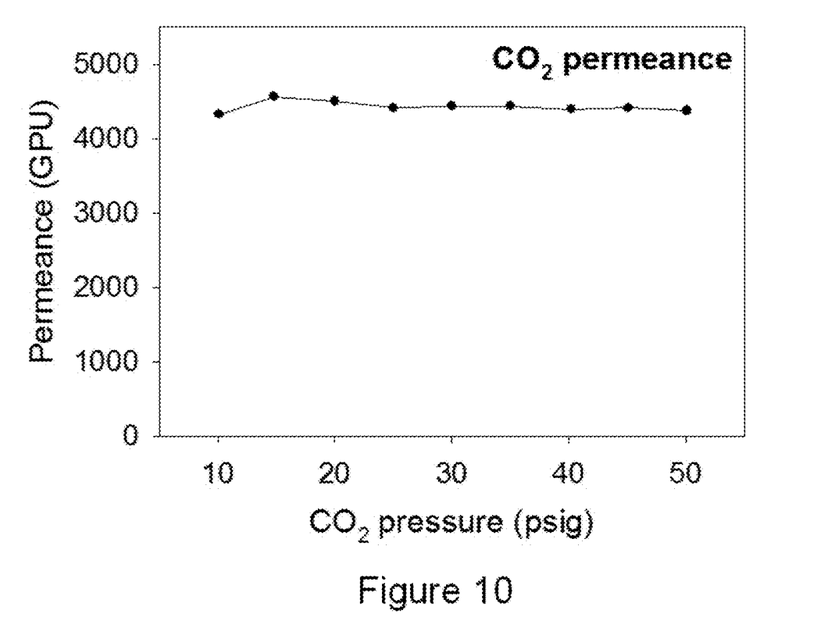
FIG. 10 is $CO_2$ permeance of mesoporous silica membrane coated on TORLON™ hollow fiber after template extraction.

To confirm uniform and defect-free mesoporous layer, $N_2$ permeance and $CO_2$ permeance of the mesoporous silica membrane coated TORLON™ hollow fiber after the template extraction were measured at the feed pressure range of 10 psig to 50 psig (FIGS. 9-10). Constant $N_2$ permeance and $CO_2$ permeance at the above pressure range indicate that the gas permeation through the membrane was governed by Knudsen diffusion in the mesopores and not through defects such as pin-holes and cracks. The mesoporous coating layer remains uniform and defect-free after the template extraction.

Figure 11:
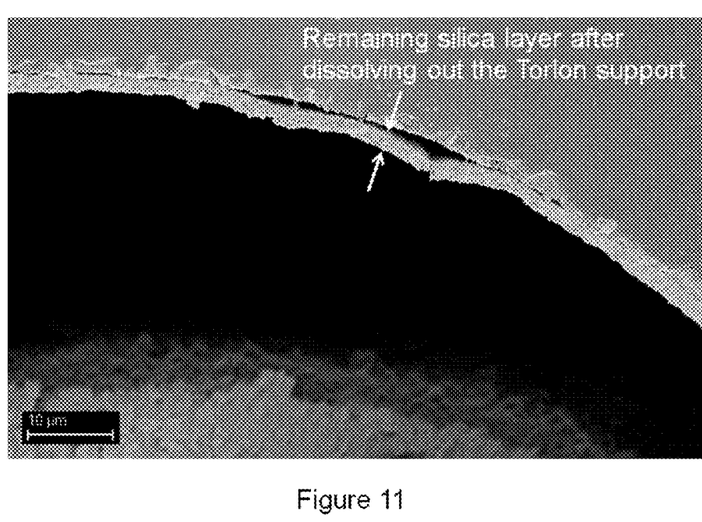
FIG. 11 is a cross-section scanning electron microscope image of the remaining silica membrane after the TORLON™-dissolving out.

The continuous mesoporous silica membrane layer coated on the TORLON™ hollow fiber after the template extraction was also confirmed by the cross-section SEM image (FIG. 4). The mesoporous silica membrane thickness is 1.6 micron. To ensure the existence of silica layer, the support TORLON™ was removed using dichloromethane. FIG. 11 is a cross-section SEM image of the remaining silica membrane after the TORLON™-dissolving out. The remaining silica layer thickness is 1.6 micron.

EXAMPLE 4

POSS™ Infiltration

Heptaisobutyl-(2-aminoethyl(3-aminopropyl)octasilsesquioxane, known as aminoethylaminopropylisobutyl-POSS™, was used as a mesopore-filling material for acid gas separation. Before the infiltration process, mesoporous silica membrane coated on TORLON™ hollow fiber after the template extraction was evacuated at room temperature for 1 hour. For the POSS™-infiltration, two 30 cm-long mesoporous hollow fibers were immersed in 10 milligrams of the POSS™/5 milliliters of chloroform solution. The fiber-immersed solution was aged at the reduced pressure range of 0.19 atm to 0.12 atm for 30 minutes. After the infiltration process, the fibers were washed with ethanol under moderate stirring for 30 minutes and dried. After the infiltration of aminoethylaminopropylisobutyl-POSS™, the mesoporous silica membrane coated on TORLON™ hollow fiber has a stable $CO_2$ permeance of 96 GPU and $CO_2/N_2$ selectivity of 16 GPU at 35° C. for gases with 50 psig feed pressure (FIGS. 5-6). The $N_2$ permeance and $CO_2$ permeance were stable over repeated 24 hour-measurements. Therefore, POSS infiltration stabilized the permeance.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A gas separation device comprising:
    a porous support structure comprising polymeric hollow fibers; and
    an inorganic mesoporous membrane disposed on the porous support structure, wherein the inorganic mesoporous membrane is uniform and free of defects, wherein the inorganic mesoporous membrane comprises a network of interconnected three-dimensional pores that interconnect with the porous support structure, and wherein the gas permeances of the inorganic mesoporous membrane are substantially higher than the gas permeances of the polymeric hollow fibers.

2. The gas separation device of claim 1, wherein the inorganic mesoporous membrane comprises a mesoporous Mobil Composition Matter (MCM).

3. The gas separation device of claim 2, wherein the mesoporous MCM is silica-based.

4. The gas separation device of claim 3, wherein the mesoporous MCM comprises MCM-48.

5. The gas separation device of claim 4, wherein the pores range between 1 nm to 5 nm in diameter.

6. The gas separation device of claim 5, wherein the pores range between 2 nm to 4 nm in diameter.

7. The gas separation device of claim 6, wherein the pores are about 3 nm in diameter.

8. The gas separation device of claim 1, wherein the inorganic material comprises a composite mesoporous material, the composite mesoporous material comprising a mesoporous MCM and molecules with functional groups comprising amine groups, quaternary amine groups, thiol groups, carboxyl groups, cyano groups, amide groups, and carbonyl groups.

9. The gas separation device of claim 8, wherein the quaternary amine is cetyl trimethylammonium bromide (CTAB).

10. The gas separation device of claim 8, wherein the mesoporous MCM comprises MCM-48.

11. The gas separation device of claim 8, wherein the mesoporous MCM comprises a mesoporous structure having a network of three-dimensional pores, and the quaternary amine is disposed in the pores of the mesoporous MCM.

12. A method for fabricating the gas separation device of claim 1, the method comprising:
    a) preparing a coating solution, wherein the coating solution comprises a mixture of silica source, a quaternary ammonium surfactant, and acidic water;
    b) providing polymeric hollow fibers;
    c) immersing at least a portion of the polymeric hollow fibers in the coating solution, thereby forming a wet mesoporous silica membrane on the polymeric hollow fibers;
    d) rinsing and drying the wet mesoporous silica membrane on the polymeric hollow fibers, thereby forming a dried mesoporous silica membrane on the polymeric hollow fiber;
    e) aging the dried mesoporous silica membrane by exposure to a vapor source of silica;
    f) extracting the surfactant from the mesoporous coating by treatment with an appropriate solvent; and
    g) infiltrating of polysilsesquioxane (POSS™) molecules into the mesopores to impart selectivity for $CO_2$.

13. The method of claim 12, wherein the quaternary ammonium surfactant comprises CTAB, and further wherein the coating solution comprises 1.0 R:a CTAB:b $H_2O$, wherein R is the source of silica, a is between 0.1 and 1, and b is between 20 and 200.

14. The method of claim 12, wherein the preparing comprises adding acid species to the solution such that the pH of the prepared solution is substantially between 0 and 4.

15. The method of claim 12, wherein the immersing comprises immersing the polymeric hollow fibers in the coating solution for a period between 10 minutes and 24 hours.

16. The method of claim 12, wherein the aging comprises aging the dried mesoporous silica membrane at a temperature substantially between 50° C. and 150° C.

17. The method of claim 12, wherein the aging comprises aging the dried mesoporous silica membrane for a period between 1 hour and 48 hours.

18. The method of claim 12, wherein the aging comprises exposing the dried mesoporous silica membrane to saturated alkoxysilane vapor.

19. The method of claim 12, wherein the coating solution further comprises CTAB, and the method further comprises:

extracting the CTAB from the aged mesoporous silica membrane with an extraction solvent; and rinsing and drying the substantially CTAB-free, mesoporous silica membrane.

20. The method of claim 19, wherein the extraction solvent comprises water or alcohol or a mixture thereof.

21. The method of claim 19, wherein the extracting comprises contacting the aged mesoporous silica membrane with the extraction solvent for a period between 1 hour and 72 hours.

22. The method of claim 19, wherein the extracting comprises contacting the aged mesoporous silica membrane with the extraction solvent at a temperature between 20° C. and 100° C.

23. The method of claim 19, wherein the pH of the extraction solvent is substantially between 0 and 7.

24. The method of claim 19, wherein the mesoporous silica membrane is subsequently functionalized with functional groups comprising amine groups, thiol groups, carboxyl groups, cyano groups, amide groups, and carbonyl groups.

* * * * *

UNITED STATES PATENT AND TRADEMARK OFFICE
CERTIFICATE OF CORRECTION

| | | |
|---|---|---|
| PATENT NO. | : 8,568,517 B2 | Page 1 of 1 |
| APPLICATION NO. | : 13/209957 | |
| DATED | : October 29, 2013 | |
| INVENTOR(S) | : Sankar Nair et al. | |

It is certified that error appears in the above-identified patent and that said Letters Patent is hereby corrected as shown below:

On the title page, Item (73) "Assignee" in the Letters Patent should be Georgia Tech Research Corporation, Atlanta, GA, not Phillips 66 Company, Houston, TX.

Signed and Sealed this
Fifteenth Day of April, 2014

Michelle K. Lee
*Deputy Director of the United States Patent and Trademark Office*